United States Patent
Krishna Raj et al.

(10) Patent No.: US 11,200,010 B2
(45) Date of Patent: Dec. 14, 2021

(54) SYSTEM AND METHOD FOR INCREASING PAGE YIELD OF A REPLACEABLE TONER CARTRIDGE

(71) Applicant: Ashwin Krishna Raj, Bangalore (IN)

(72) Inventors: Ashwin Krishna Raj, Bangalore (IN); Chandran Binu, Kollam (IN)

(*) Notice: Subject to any disclaimer, the term of this patent is extended or adjusted under 35 U.S.C. 154(b) by 11 days.

(21) Appl. No.: 16/639,599

(22) PCT Filed: Aug. 16, 2018

(86) PCT No.: PCT/IB2018/056153
§ 371 (c)(1),
(2) Date: Feb. 17, 2020

(87) PCT Pub. No.: WO2019/035019
PCT Pub. Date: Feb. 21, 2019

(65) Prior Publication Data
US 2021/0165613 A1 Jun. 3, 2021

(30) Foreign Application Priority Data
Aug. 18, 2017 (IN) .............................. 201741029261

(51) Int. Cl.
*G06F 3/12* (2006.01)
*G06K 15/00* (2006.01)

(52) U.S. Cl.
CPC .......... *G06F 3/1219* (2013.01); *G06F 3/1229* (2013.01); *G06F 3/1254* (2013.01); *G06F 3/1273* (2013.01); *G06K 15/4075* (2013.01)

(58) Field of Classification Search
None
See application file for complete search history.

(56) References Cited

U.S. PATENT DOCUMENTS

| | | | |
|---|---|---|---|
| 2008/0144080 A1* | 6/2008 | Randt | G06F 3/126 358/1.15 |
| 2013/0108296 A1* | 5/2013 | Iinuma | G06F 3/1219 399/53 |
| 2014/0002537 A1* | 1/2014 | Thacker | B41J 2/17546 347/19 |
| 2014/0376931 A1* | 12/2014 | Thacker | G03G 15/5079 399/12 |
| 2015/0063840 A1* | 3/2015 | Shibuya | G03G 15/556 399/27 |
| 2016/0004494 A1* | 1/2016 | Mishima | G06F 3/1204 358/1.13 |
| 2016/0316082 A1* | 10/2016 | Ishii | H04N 1/00015 |
| 2017/0182822 A1* | 6/2017 | Okamoto | G06F 3/1259 |
| 2018/0004468 A1* | 1/2018 | Morovic | G06F 3/1273 |

* cited by examiner

*Primary Examiner* — Henok Shiferaw

(57) ABSTRACT

An intelligent Print Device monitoring & manipulation method provided on a host computer that continually tracks in the connected/accessible print devices parameters like toner or ink cartridge/container along with identities & toner levels. As & when certain device statuses change, the invention will accordingly & progressively alter the density/resolution and such allied print device setting to achieve higher page yield from the available toner/ink present in cartridge. The alteration activity can be initiated automatically on-site &/or manually from remote location, when it is added as part of system platform that bridges client sites having print devices and the host computer to external service providers.

8 Claims, 5 Drawing Sheets

SYSTEM AND METHOD FOR INCREASING PAGE YIELD OF A REPLACEABLE TONER CARTRIDGE

CROSS-REFERENCE TO RELATED APPLICATION

The instant application is a national phase of PCT International Patent Application Serial No. PCT/IB2018/056153 Filed 16 Aug. 2018, and claims priority to Indian Patent Application Serial No. 201741029261 filed Aug. 18, 2017, the entire specifications of both of which are expressly incorporated herein by reference.

FIELD OF INVENTION

The present invention relates to increasing page yield of a replaceable toner cartridge used electrographic printers including laser based printers, multifunction devices or similar printed image forming apparatus. In printers toner, ink and other printing materials are contained in removable cartridges that may be replaced periodically, for example when the printing material is fully consumed.

BACKGROUND OF INVENTION

A laser based printer having a hopper containing a limited fixed quantity of toner, prints by transferring toner on to a printing medium or sheet by using an electrographic process. Specifically, the printer charges the surface of a photoconductive element with a charger, electrostatically forms a latent image on the charged surface of the photoconductive element with an exposing unit, develops the latent image with a toner, transfers the toner to a sheet with an image transfer unit, and then fixes the toner on the sheet with a fusing unit. The number of pages printed is written on to a memory carried on the cartridge.

The problem with the current method of printing, the printing process is constant for the duration of printing, until changed otherwise. In the current process of printing an amount of toner is gathered in waste chamber of cartridge and the factory set limits make printer display low toner messages even before the toner is almost empty.

In light of the above, there is a proposed method of altering the process of printing such a way that additional pages can get printed from the same amount of toner carried by the cartridge.

SUMMARY OF THE INVENTION

It is therefore the object of the present invention to provide a method of continually altering the process of printing, reducing the amount of toner going to the waste chamber. Also curtailing the limits when the low messages begin allows the cartridge to continue printing till the toner is actually almost empty. Thus with this method additional pages can get printed from the same amount of toner carried by the cartridge, whereby giving a page yield beyond the declared amount. By getting additional page, the amount of cartridges used gets reduced thereby benefiting economy and the amount of e-wasted generated.

BRIEF DESCRIPTION OF THE DRAWINGS

Examples disclosed herein aimed at increasing the page count capable of being printed by a printer cartridge carrying a set amount of toner, involve adjusting print settings based on number of pages printed combining the amount of toner available in the printer cartridge along with data stored and written on to a memory chip that is a component on the printer cartridge. An example a page yield enhancement process is run monitoring and determine a variety of parameters including number of pages being printed, cartridge toner levels, the set image density and dot resolution of the printer and then accordingly continually change/adjust the settings of the printer or a plurality of printers in order to increase the amount of pages that can be printed from an installed cartridge till the end of the cartridge life gauged from data retrieved from the cartridge memory and optimal exhaustion of toner.

The above objects, features and advantages of the present invention will become more apparent from the following detailed description taken with the accompanying drawings in which:

BRIEF OF THE DRAWINGS

Figure 1:
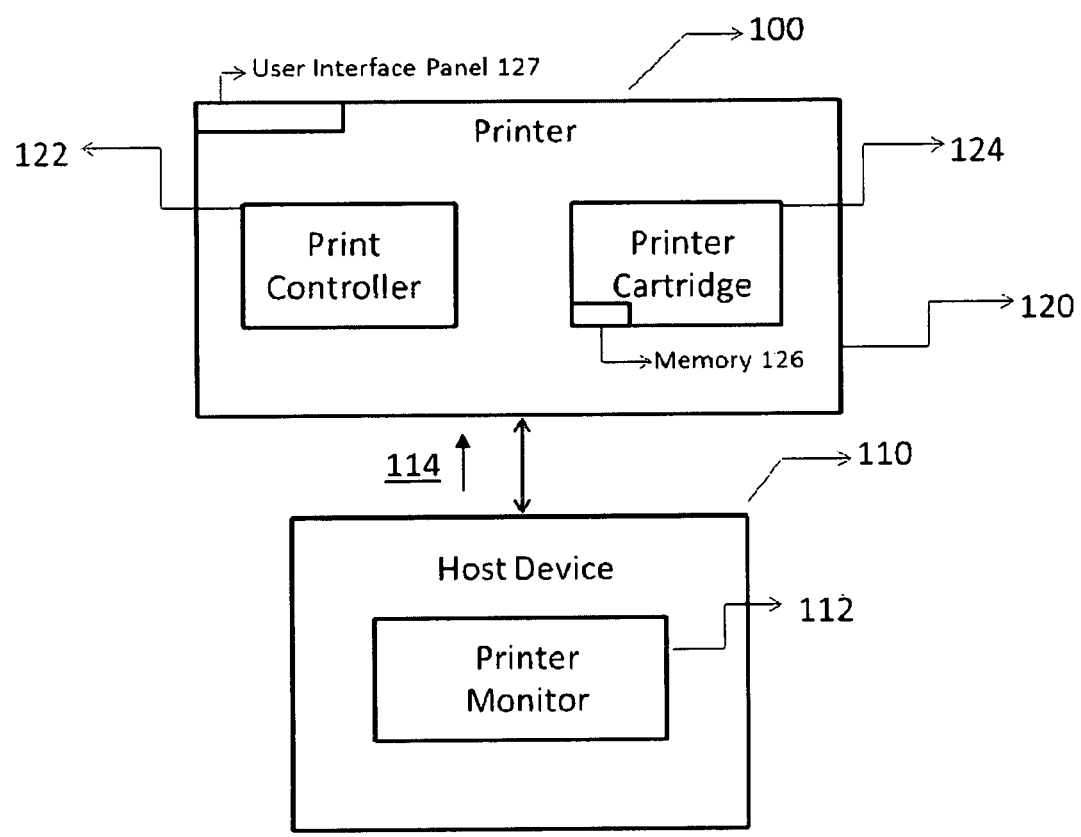
Figure 2:
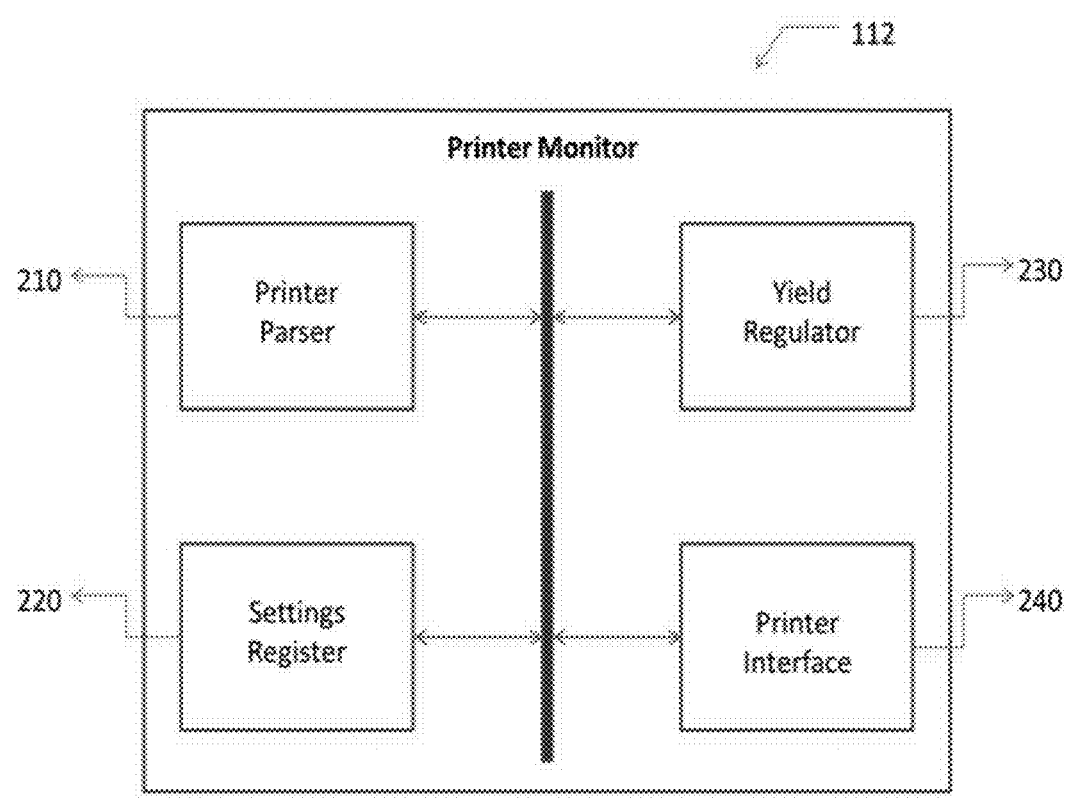

FIG. 1: Description of printer monitor in a host device and connected printer;

FIG. 2: Description of embodiments of the printer monitor.

Figure 3:
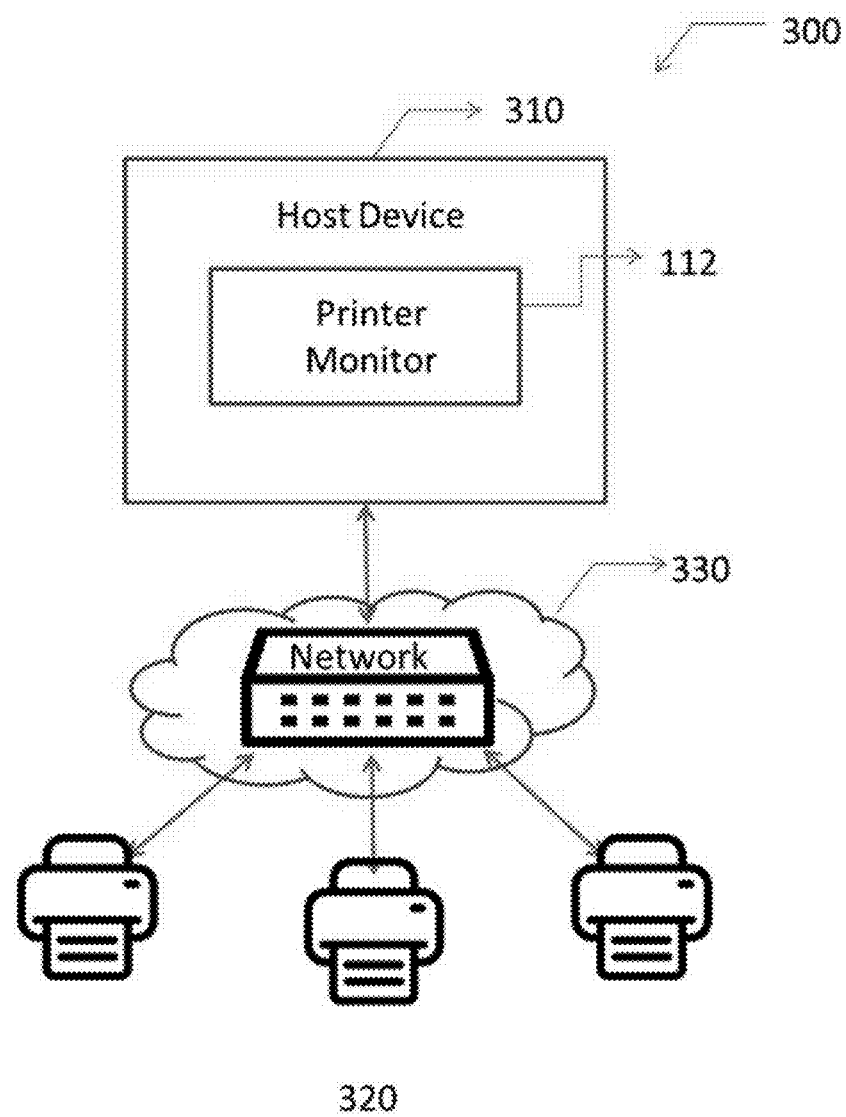

FIG. 3: Description of printer monitor in a system with a plurality of printers.

Figure 4:
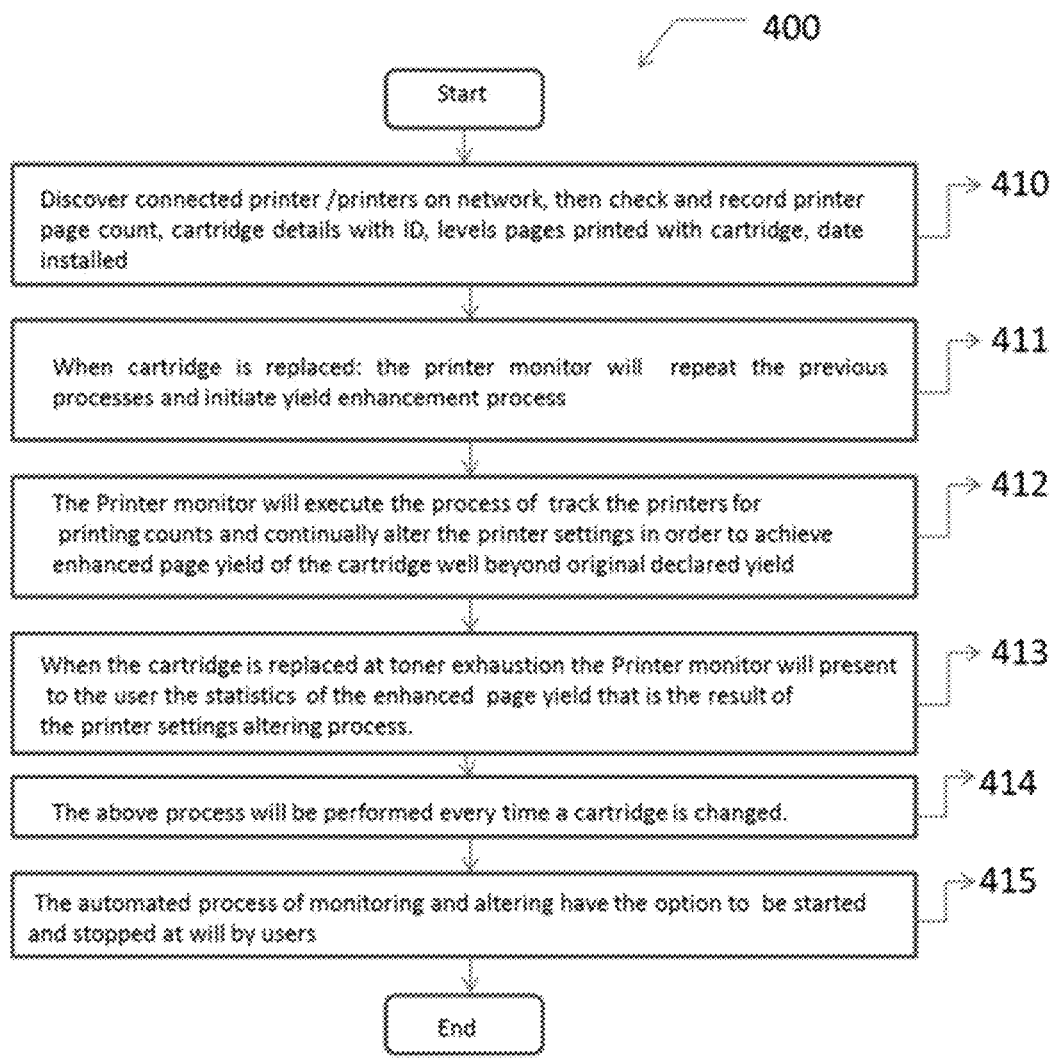

FIG. 4: Description of the flow of the enhancement process.

Figure 5:
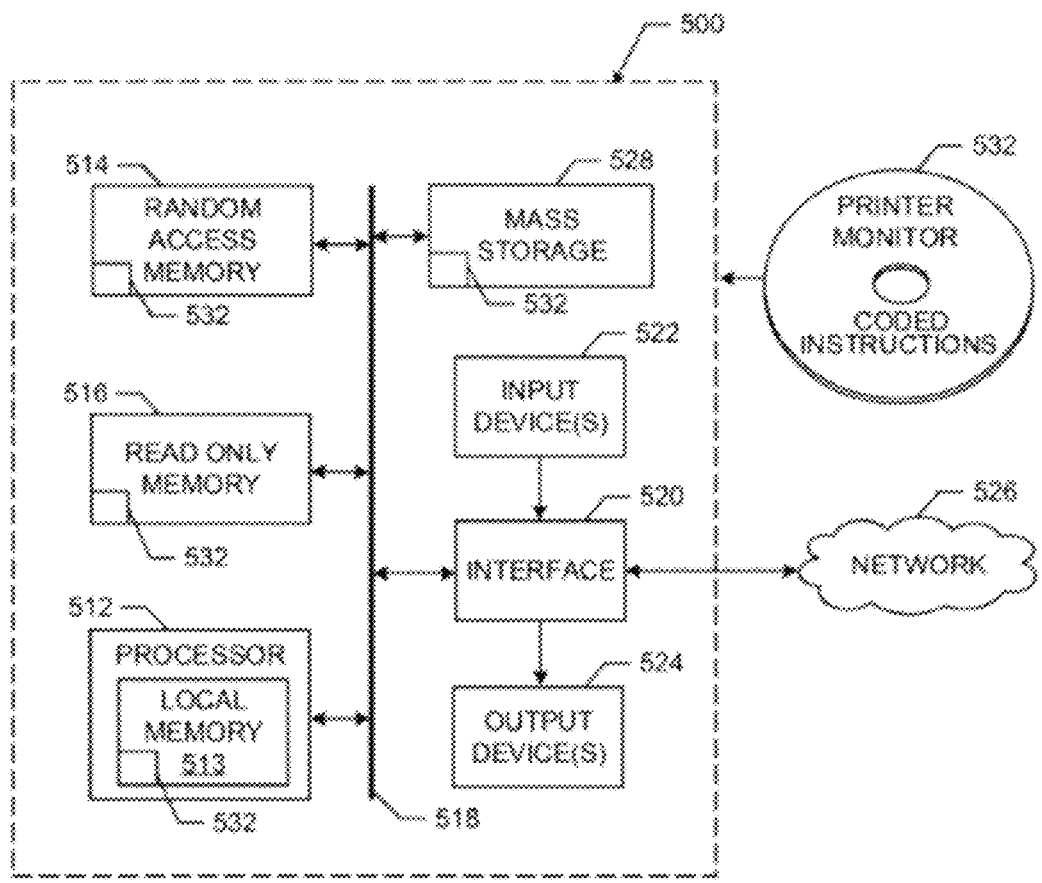

FIG. 5: Description of embodiments of a host device capable of running the enhancement process

DETAILED DESCRIPTION OF THE EMBODIMENTS

FIG. 1 is a schematic diagram of an example printing system 100 that may be implemented in accordance with an aspect of this disclosure. The example printing system 100 includes a host device 110 and a printer 120 that carries a User Interface Panel 127 capable of presenting messages, The example host device 110 includes an example printer monitor 112 that runs as a service in the host device is constructed in accordance with the teachings of this disclosure, Examples disclosed herein involve the printer monitor 112 monitoring printed media of the printer 120 and adjusting print settings of the printer 120 based on number of pages printed and amount of toner present in Cartridge 124 having a memory chip 126.

The host device 110 in the illustrated example of FIG. 1 may be any computing device, such as a personal computer (e.g., a laptop computer, desktop computer, etc.) a mobile device (e.g., a tablet computer, a smartphone, a personal digital assistant (PDA), etc.), a server, etc., A user may access the printer 120 via the host device 110 to print media (e.g., images, documents, etc.) onto substrates (e.g., paper, cardboard, card stock, plastic, etc.). For example, the user may create the media to be printed by the printer 120 using applications or programs stored or executed by the host device 110 using any suitable technique. The host device 110 may be communicatively coupled with the printer 120 a plurality of printers via a direct communication link (e.g., a wired or wireless communication link) or an indirect communication link (e.g., via a communication link involving a network or other device), (e.g., see FIG. 3).

The example printer 120 includes a printer controller 122 and a print cartridge 124. The example printer controller 122 controls mechanisms (e.g. cartridges, toners, rollers, etc.) of the printer 120 to print media or images onto a substrate. The printer controller 122 may have various settings to control the application of toner, ink or other substance to the substrate. For example, settings may include speed settings, margin settings, etc. along with image quality settings (e.g., image density, resolution, etc.). For example, the printer controller 122 may continually receive monitoring and image forming process altering instructions that are coded in 114 using appropriate printer settings commands in languages that include and not limited to pml, pjl, snmp, html, pcl, ps etc., of the printer monitor 112 to adjust settings of the image density and resolution or any such allied image forming process properties of printer 120 by increasing and/or subsequently decreasing the properties dependent on number of pages printed between two such altering instances based on the teachings of this disclosure. In the examples, the printer controller 122 may adjust toner replacement settings for the cartridge 124 of the printer 120 based on analyses performed in accordance with the teachings of this disclosure.

FIG. 2 is a block diagram of an example printer monitor 112 that may be used to implement the example Printer Monitor 112 of FIG. 1. The example printer monitor 112 of FIG. 2 includes a Printer Parser 210, a settings register 220, a Yield regulator 230, and a printer interface 240. The Printer Parser 210, the settings register 220, the Yield regulator 230, and the printer interface 240 may communicate with one another.

In The example solution includes a Printer Parser 210 of FIG. 2 identifies printers and then reads the current printer settings that include the page counts of the printer, the cartridge levels with usage details gathered from the cartridge memory chip 126, the density setting, resolution settings along with all relevant details needed to perform activities described in this present invention. The collected details are recorded in the Settings Register 220 as a reference points that become the basis for quantum of altering the printer image forming process settings to achieve the maximum possible page yield from the cartridge before it needs to be replaced.

The yield regulator 230 is the main component of the printer monitor 112 that is responsible to gauge settings and then accordingly keep changing the settings of the printer be it the density and/or resolution and any allied image forming process settings.

The example Yield Regulator 230 that is master component of the printer monitor 112 installed in the host device 110 that carries the processor platform 500 first only records the details of the printer page count, cartridge 124 usage details from its memory 126 with the density and resolution setting details of the printer 120 or the plurality of printers 320 that is recorded into settings register 220. This repository of data prior to beginning the process forms the basis for the measurement process of altering the printer image forming process settings to maximize the page yield of cartridge 124.

The printer monitor 112 installed in the host device 110 that carries the processor platform 500 initially only records settings of printer 120 and values of pages printed from cartridge or the plurality of printers 320.

When a new cartridge 124 is installed in the printer, the printer parser 210 reads the memory chip 126 of the cartridge 124 and records this into settings register 220 along with the other details of page count, density, resolution and allied setting details, that become the default settings.

The example Yield Regulator 230 that is in the Printer monitor 112 gauges from the settings register 220 that the cartridge 124 is new by reading the new serial number that is present in the memory chip and is having full toner capacity. It now begins the process of tracking and altering the image forming process settings of the printer 120. The yield regulator 230 sends instructions using appropriate printer settings commands to printer controller 122 through the printer interface 240 to reduce toner density setting of the printer 120 from default setting to a much lower value with/without changing the print resolution setting. The printer parser 210 records this change and writes this into settings register 220 by over writing previous values.

The printer 120 prints the jobs given to it by user. The Printer parser 210 reads and records the new page count of printer 120 and the memory 126 of cartridge 124 that will keep getting updated with counts of pages printed from the installed cartridge.

The yield regulator 230 check these details and when the counts increase by a set number of pages sends instructions using appropriate printer settings commands to printer controller 122 to increase the toner density setting of the printer 120 from the previous set lower value to a much higher value with/without changing the print resolution setting to a corresponding device settable higher or lower value. The need for changing the toner density setting in conjunction of changing resolution is to see that there is not a too much perceptible change in the quality of the prints which will definitely vary. This variation will not be easy to detect by an untrained eye.

In the example the difference of page counts allowed for the yield regulator 230 to trigger the setting change instruction at lower density values 1 with/without changing the print resolution setting to a corresponding device settable higher or lower value is 3 pages. When 3 pages get printed and recorded, the yield regulator 230 will set the printer 120 to higher density value 3 with/without changing the print resolution setting to a corresponding device settable higher or lower value for 2 pages before triggering a change to lower value setting.

In example the cartridge memory 126 keeps records of the pages printed by the cartridge carrying the memory. When the page count memory counter reaches a variable low toner alert level mostly set to 10% to page yield of the cartridge model, the printer controller 122 will keep printing but will start to present toner low message on the printer 120 User Interface Panel 127/mail so that the user orders a fresh cartridge ready to be replaced when this cartridge becomes empty. The consequence is the possibility of user replacing this cartridge even though there is still some toner/ink present that can give a significant amount of print outs.

The yield regulator 230 from the printer monitor 112 will send instructions using appropriate printers image forming process settings commands to printer controller 122 to move the variable low toner alert level to the least level so that the printer 120 will not present any low message on User Interface Panel 127 while at the same time sending an alert to the user via email sent to user mail id using network 526 or a message pop up on the output devices 524 stating that 'there is still toner left in the cartridge for few prints only and keep a replacement cartridge ready for replacement and continue to print until the toner is exhausted or print quality drops beyond acceptability.

This process to increasing and decreasing the printer's image forming process settings is a continuous process that will reset and start over again after a new cartridge is installed in the printer. The printer monitor 112 will present the statistics of page yield of the first cartridge when the enhancement process was not initiated and henceforth the increased page yield of subsequently used cartridges as a report to the user.

There can be cases when this process of altering the image forming process settings of the printer 120 or one or all of the plurality of printers 320 needs to be capable of being stopped or restarted by user. This is achieved by through a user interface of the printer monitor 112 that has the start and stop button visible on output device 524 of the host device 110 and on the host device 310 in case of plurality of printers 320 accessible by the user/third party service provider on the network 330.

FIG. 3 is a schematic diagram of an example printing system 300 that may be implemented in accordance with an aspect of this disclosure, The example printing system 300 of FIG. 3 includes a host device 310, a plurality of printers 320, and a network 330. The example network 330 may be any type of network, including a local area network (LAN), a wide area network (WAN), Wi-Fi network the internet, etc., The example host device 310 includes a printer monitor 112, which may be implemented in accordance with the teachings of this disclosure.

Each of the plurality of printers 320 in the illustrated example of FIG. 3 may be a same printer model or similar printer model, such as a same model or similar model of the printer 120 of FIG. 1. Although the plurality of printers 320 in the illustrated example of FIG. 3 includes three printers, any number of printers may be included in the plurality of printers 320. Accordingly, each of the plurality of printers 320 may include a printer controller (e.g., the printer controller 122) and a print cartridge (e.g., the print cartridge 124) that may communicate with the printer monitor 112 of FIG. 3. The printer monitor 112 in the host device 310 will be constantly monitor plurality of printers 320 and the printer's image forming process settings of each of the plurality of printers 320 be altered continually via the network 330 as implemented in accordance with the teachings of this disclosure.

The process of altering the printer settings occurring continually actuated by the printer monitor 112 as described in this invention has to be done continually during the printing activity to get the enhanced yield. If the printer's image forming process settings are set and kept lower levels indefinitely, then the printer cartridge 124 can experience a midlife failure as its components will get worn out faster than the toner getting exhausted.

In the illustrated example of FIG. 3, the printer monitor 112 may use information corresponding to device usage information got from the plurality of printers 320 in accordance with the teachings of this disclosure. For example, print controllers on the plurality of printers may send printer information (e.g., cartridge use, toner availability, set resolution, density, etc.) along with printer page counts to the printer monitor 112 of FIG. 3.

The printer monitor 112 may use the statistics of the information detected across the plurality of printers to determine whether adjustments or printer setting alterations for any of the plurality of printers 320 is needed. For example, a first printer of the plurality of printers 320 may begin to print media with a set printer information e.g., cartridge use, toner availability, set resolution, density, etc.) which will be recorded by the printer monitor 112.

Based on information gathered from the first printer or any of the other printers of the plurality of printers 320, the printer monitor 112 may run an page yield enhancement process by sending the monitoring and altering instructions 114 to the printer controller 122 to alter the print setting of the printer 120 or the plurality of printers 320 to enhance the page yield of cartridge 124 of the first printer or plurality of printers.

The process 400 of FIG. 4 begins with step 410 an initiation of the printer monitor 112 (e.g., upon start up, upon instructions from a user, upon startup of a device implementing the printer monitor 112 (e.g., the host device 110) host device 310 when it is a node in a network, etc.). At block 410, the printer parser 210 monitor discovers all connected print devices including plurality of printer 320 and records the page counts and relevant cartridge details into settings register 220 stored to be presented to user.

In the process 411 Whenever a cartridge 124 is replaced in the printer 120 or plurality of printer 320 the printer monitor 112 will record details again as in 410. The example Yield Regulator 230 that is master component of the printer monitor 112 installed in the host device 110 that carries the processor platform 500 first only records the details of the printer page count, cartridge 124 usage details from its memory 126 with the density and resolution setting details of the printer 120 or the plurality printers 320 that is recorded into settings register 220.

The process 412 The yield regulator 230 of the printer monitor 112 will begin to execute altering the printer's image forming process settings of printer 120 or plurality of printers 320 by sending instructions to printer controller 122 prior to and during execution of print jobs. The printer parser 210 will also be working constantly updating the yield regulator 230 and setting register 220. The printer monitor 112 will calculate and present the statistics of page yield of the first cartridge when, the enhancement process was not initiated and henceforth the increased page yield of subsequently used cartridges as a report to the user.

In 413, at toner exhaustion whenever the cartridge 124 is replaced, the printer monitor 112 will read the enhancement results from the settings register 220 and present them to user on output device 524 showing the results of page yields of cartridge collected at process 410 before process 412 was started and compared with results after process 412 was started.

In example 414, the process starting from 411 till 413 will be initialized every single time a cartridge 124 is replaced and the event is recorded by printer monitor 112.

The process 415 the process of starting and stopping the yield regulator 230 of the printer monitor 112 of printer 120 or the plurality of printer 320 is presented to user through output device 524 of the host device 110 and on the host device 310 in case of plurality of printers 320 accessible by the user/third party service provider oil the network 330. Based on statistics information gathered from the first printer or any of the other printers of the plurality of printers 320, the printer monitor 112 may run a page yield enhancement process by sending the monitoring and altering instructions 114 to the printer controller 122 to alter the print setting of the printer 120 or the plurality of printers 320 to enhance the page yield of cartridge 124 of the first printer or plurality of printers.

FIG. 5 is a block diagram of an example processor platform 500 capable of executing the instructions to implement the printer monitor 112 of FIG. 2, The example processor platform 500 may be or may be included in any type of apparatus, such as a server, a personal computer, a mobile device {e.g., a cell phone, a smart phone, a tablet, etc.), a personal digital assistant (PDA), an Internet appliance, a printer with sufficient memory, or any other type of computing device.

The processor platform 500 of the illustrated example of FIG. 5 includes a processor 512. The processor 512 is a hardware that can be implemented by at least one integrated circuit, logic circuit, microprocessor or controller with a main memory including a volatile memory 514 and a non-volatile memory 516 via a bus 518.

The processor platform 500 of the illustrated example also includes an interface circuit 520, The interface circuit 520 may be implemented by any type of interface standard, such as an Ethernet interface, a universal serial bus (USB), Wi-Fi or a peripheral component interconnect (PCS) express interface.

In the illustrated example, at least one input device 522 is connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touch screen, a track-pad, a trackball, iso-point or a voice recognition system.

At least one output device 524 is also connected to the interface circuit 520 of the illustrated example. The output device(s) 524 can be implemented, for example, by display devices (e.g., a light emitting diode (LED), an organic light emitting diode (OLED), a liquid crystal display, a cathode ray tube display (CRT), a touch screen, a tactile output device, a Sight emitting diode (LED), a printer or speakers). The interface circuit 520 of the illustrated example, thus, may include a graphics driver card, a graphics driver chip or a graphics driver processor.

The processor platform 500 of the illustrated example also includes at least one mass storage device 528 for storing executable instructions (e.g., software) or data. Examples of such mass storage device(s) 528 include floppy disk drives, hard drive disks, compact disk drives, Blu-ray disk drives, RAID systems, and digital versatile disk (DVD) drives.

The coded instructions 532 of FIG. 4 may be stored in the mass storage device 528, installed in the local memory 513, in the volatile memory 514, in the non-volatile memory 516, or on a removable tangible computer readable storage medium such as a Pen Drive, CD or DVD.

We claim:

1. A method for increasing printer (120/320) page yield of a replaceable toner cartridge (124) comprising of:
   recording a plurality of settings of a printing system by a print parser (210) wherein said settings include page counts, toner density, resolution and cartridge levels with usage details;
   characterized in that
   calculating and presenting statistics of the page yield corresponding to the recorded plurality of the settings of the printing system by a printer monitor; and
   sending instructions (114) by the printer monitor via a processor to a print controller (122) to monitor and adjust the image forming process settings of the printing system based on the calculated statistics, wherein image forming process settings include toner density and resolution, thereby increasing page yield of the printer cartridge (124) by monitoring and adjusting the image forming process settings prior to running the enhancement process for the same amount of loaded toner in the printer's cartridge.

2. The method as claimed in claim 1, wherein the instructions (114) are coded using the printer setting commands.

3. The method as claimed in claim 2, wherein the printing system comprising a single (120) or a plurality of printers (320), and wherein the print controller (122) capable of receiving the instructions (114) in the form of commands.

4. The method as claimed in claim 3, wherein the adjusting include increasing and/or decreasing of the image forming process settings and is a continuous process, wherein the image forming process settings is reset after a new cartridge (124) is installed in the printer (120/320).

5. The method as claimed in claim 4, wherein the instructions (114) are send from a yield regulator (230) through a printer interface (240) to the printer (120) or a plurality of printers.

6. The method as claimed in claim 5, wherein users capable to stop or restart the image forming process settings of the printer (120/320) using the printer interface (240) provided with a start and stop button.

7. The method as claimed in claim 6, wherein the method includes sending an alert to the user via mail id using a network (526) or a message pop up on an output device (524) when the toner level left in the cartridge (124) for few prints only.

8. A system (100) for increasing printer (120/320) page yield of a replaceable toner cartridge (124), wherein the system comprises:
   a printer (120) and/or a plurality of printers (320) wherein the printers capable of accepting the image forming process commands; and
   a host device (110) capable of running the enhancement process in the printer (120) and/or plurality of printers (320) and adjust the print settings, according to the method claimed in claim 1.

* * * * *